United States Patent [19]

Switall

[11] 4,392,508
[45] Jul. 12, 1983

[54] PROPORTIONAL MIXING SYSTEM WITH WATER MOTOR DRIVE

[75] Inventor: Thomas G. Switall, Wheeling, Ill.

[73] Assignee: Ryco Graphic Manufacturing, Inc., Wheeling, Ill.

[21] Appl. No.: 254,446

[22] Filed: Apr. 15, 1981

[51] Int. Cl.³ .............................................. F16K 19/00
[52] U.S. Cl. ........................................ 137/99; 91/345; 92/13.3; 222/132; 222/135; 222/145; 417/399
[58] Field of Search ................... 91/345, 346; 92/13.3; 137/99, 99.5; 222/57, 132, 135, 145; 417/399

[56] References Cited

U.S. PATENT DOCUMENTS

| | | | |
|---|---|---|---|
| 1,044,197 | 11/1912 | Larson | 91/345 |
| 2,887,094 | 5/1959 | Krukemeier | 137/99 X |
| 3,260,212 | 7/1966 | Johnson | 417/399 X |
| 3,330,211 | 7/1967 | Faro | 417/399 X |
| 3,815,621 | 6/1974 | Robinson | 137/99 |
| 3,967,634 | 7/1976 | Scherer | 137/99 |
| 4,004,602 | 1/1977 | Cordis | 137/99 |
| 4,269,327 | 5/1981 | Welch | 222/135 |

OTHER PUBLICATIONS

Drawing dated 3/28/80 for a piston proportioner ass'y made for an entity called Crown Technology.

Primary Examiner—Robert G. Nilson
Attorney, Agent, or Firm—Lee, Smith & Jager

[57] ABSTRACT

A proportional mixing system with water motor drive is provided for mixing water with one or more chemicals in selected proportions. The system is completely water driven and automatically meters out a set amount of water for mixing in desired proportion with one or more chemicals, each chemical being separately pumped by an individual pump. All pumps are linked to the water motor drive and may be individually set at a proportion to be mixed, or any individual pump may be set to an off position.

7 Claims, 11 Drawing Figures

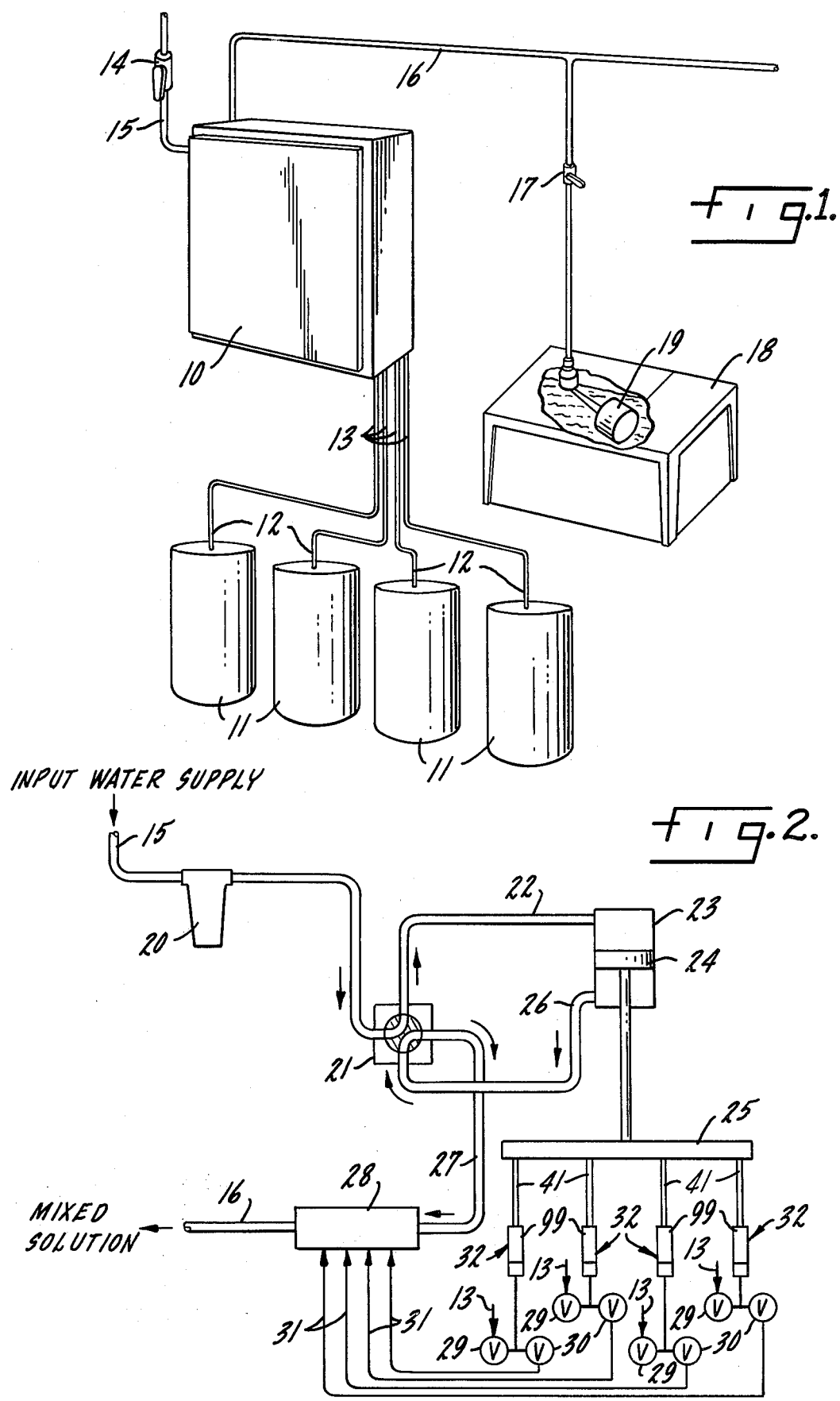

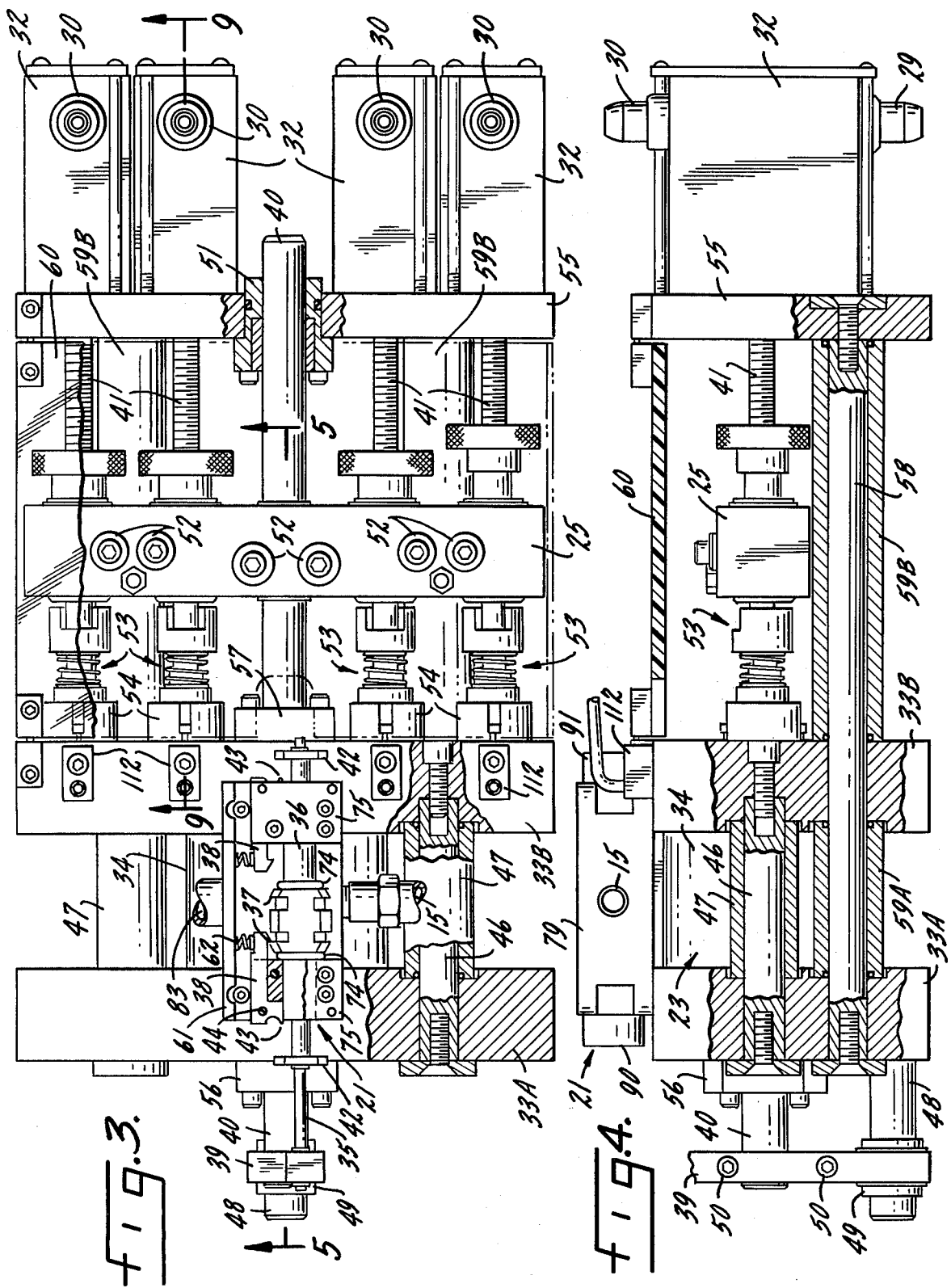

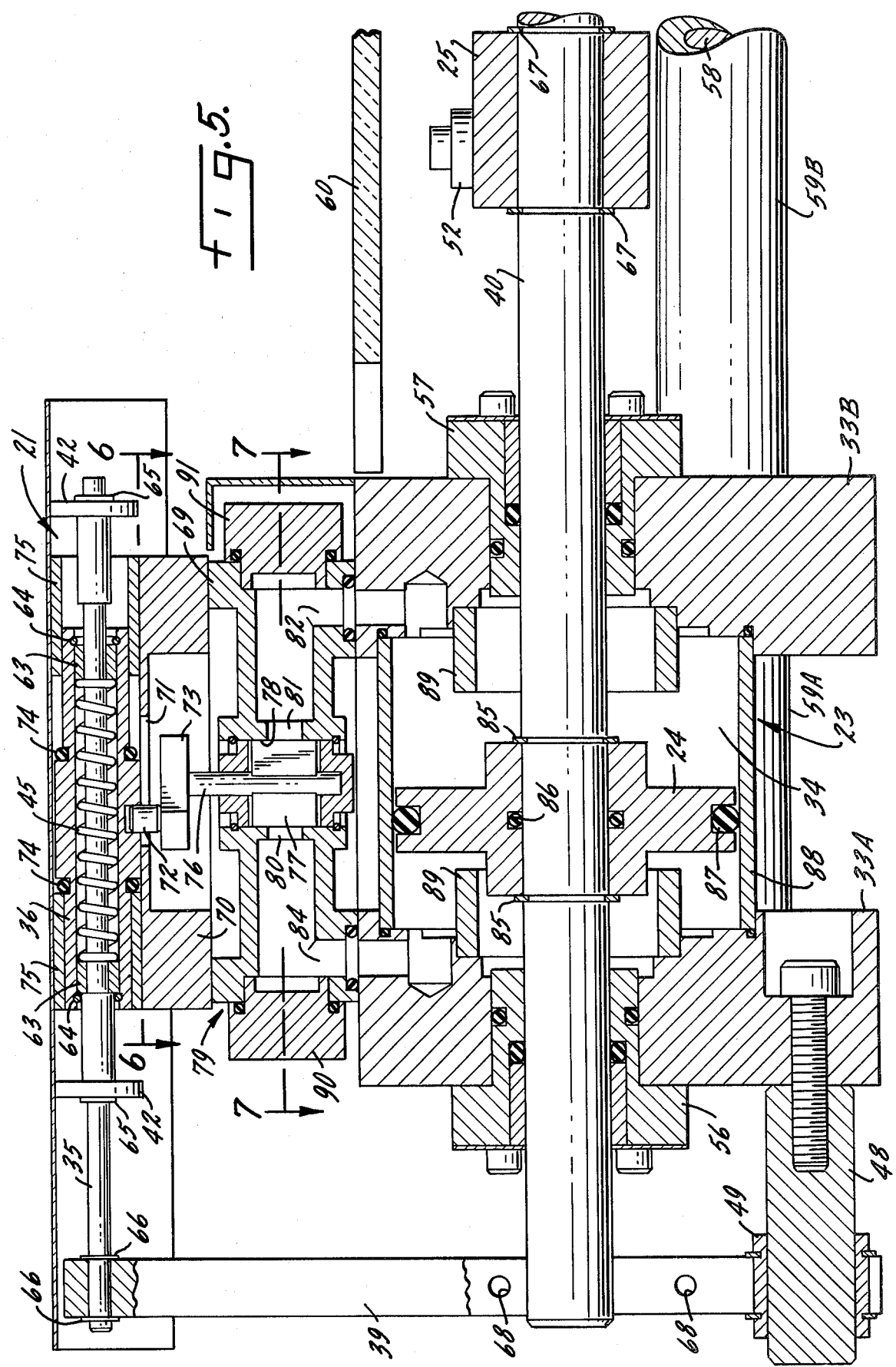

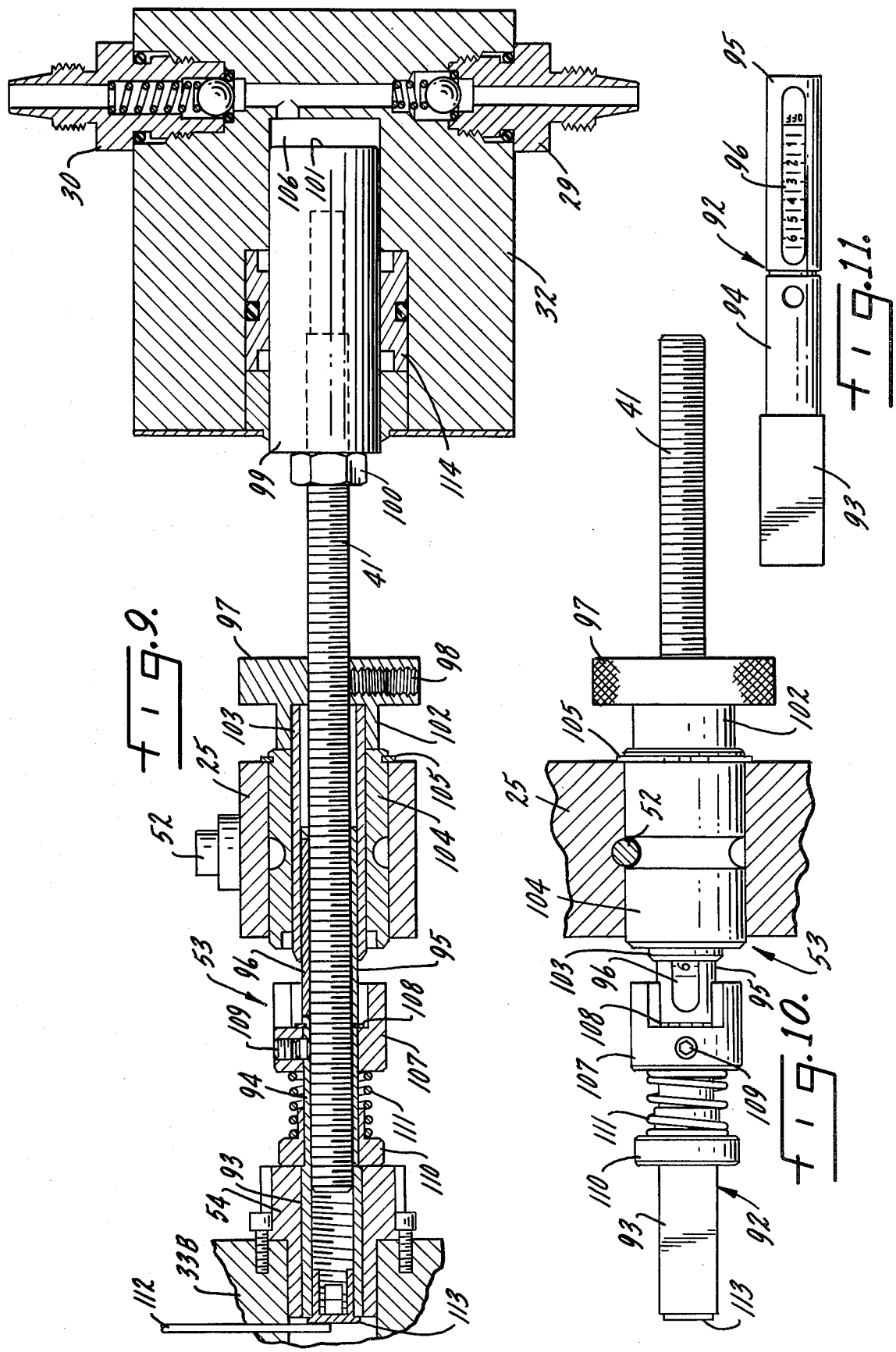

PROPORTIONAL MIXING SYSTEM WITH WATER MOTOR DRIVE

BACKGROUND AND SUMMARY OF THE INVENTION

The present disclosure is directed toward a proportional mixing system which links metering pumps to a water motor drive assembly in which the pumps are calibrated for selected proportions of chemicals to be pumped and blended with the water driving the system.

Unlike previous mixing systems, the present invention links a plurality of pumps with a water motor drive assembly whereby selected proportions of chemicals can be metered and mixed with water driving the system. Any of the pumps may be individually turned to an off position and selected proportions of any or all chemicals may be pumped from reservoir drums, or the like. Moreover, the invention facilitates exact amounts of water driving the system to meet selected proportions of chemicals pumped by the very action of the driving water flow.

In attaining this proportional mixing, water is first introduced to a cylinder chamber in which is housed a driving piston which travels in response to water filling the chamber alternately to either side of the piston. In the course of filling the chamber on one side of the piston, water at the other side is emptied. When this occurs a trip device disengages a pawl latch from retention of a spring shift cylinder. A spring, compressed in response to the filling chamber, forces the spring shift cylinder to switch to a second retained position at a second latch pawl which motion rotates a vane housed in a valve block and re-directs water to the other side of the chamber forcing the water motor drive piston in the other direction to empty the filled side. The procedure is repeated from the second position back to the first position whereby the chamber is continually filling and emptying alternately from each side thereby driving the drive piston and an attached main piston shaft in a reciprocating path. The motion drives the chemical pumps by means of an engaged pump ram arm communicating with piston shaft assemblies of the pumps. Water expunged from the water motor meets with pumped chemicals in a mixing means.

The system may include electric sensing devices indicating the pumps that are activated and further indicating reservoir drum content. Accordingly, the system includes very few moving parts and is driven solely by incoming water pressure. The proportioned chemicals are blended with the driving water at the mixing means separate from the water motor drive assembly and can be stored, or directly pumped to usage as desired.

BRIEF DESCRIPTION OF THE DRAWING

FIG. 1 is a pictorial view of the invention in its operational arrangement.

FIG. 2 is a diagramatic illustration of the paths of water and chemicals in a mode best embodying the invention.

FIG. 3 is a plan view, partially broken away, showing the preferred mode of practicing the invention with components thereof in assembled form.

FIG. 4 is a partial elevational view of the mode of the invention shown in FIG. 3 with portions thereof broken away for purposes of explanation.

FIG. 5 is a cross-sectional view taken along line 5—5 of FIG. 3 looking in the direction of the arrows.

FIG. 9 is a cross-sectional view of a metering pump taken along line 9—9 of FIG. 3 looking in the direction of the arrows.

FIG. 10 is a plan view of the piston shaft assembly as in FIG. 9, showing the preferred mode of the means for adjusting the metering piston stroke.

FIG. 11 is a plan view of the internally threaded rod stop for the piston shaft assembly shown in FIG. 10.

DESCRIPTION OF AN EXAMPLE OF THE MODE BEST EMBODYING THE INVENTION

Figure 6:
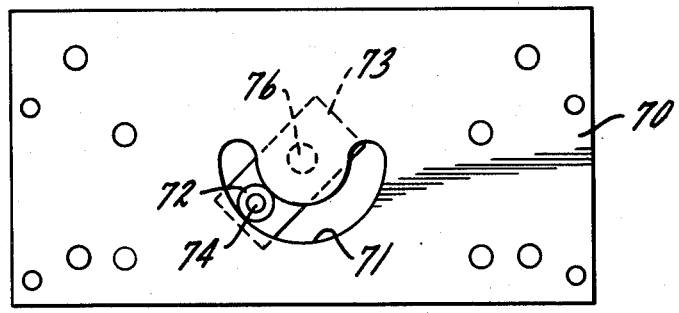
FIG. 6 is a plan view of the valve switch plate taken along line 6—6 of FIG. 5 looking in the direction of the arrows.

The proportional mixing system of this invention allows for the simultaneous mixing of a plurality of chemicals with water by means of a water motor drive operating the system with relatively few moving parts. The pictorial illustrated in FIG. 1 shows how the invention can be installed in an operational embodiment. The proportional mixer with water motor drive may be housed in a mountable cabinet 10 for ease of access and operation in a factory, or the like. Chemical reservoirs 11 feed chemicals to the proportional mixer via siphons 12 into chemical inlets 13. Water driving the system is introduced at water inlet 15 through valve 14. Mixed water and chemicals, or liquids, are ultimately pumped out through line 16 for use immediately, or may be additionally directed through valve 17 into a mixture reservoir 18. A float level control 19 may be optionally used to automatically control water flow on demand into the system by switching valve 14 off and on in a conventional manner.

FIG. 2 is a schematic of water and chemical flow through the proportional mixing system and symbolically depicts components thereof for purposes of explanation. Input water feeds through inlet supply line 15 and may be filtered at 20 after passage through valve 14. The water then passes to reversing switch and valve assembly 21 wherein it is directed at 22 into water motor 23 in which water motor piston 24 is moved by the water pressure. Water input is directed to either side of water motor piston 24 and at both backstroke and forestroke of the piston, water is expunged at 26, returns to reversing switch and valve assembly 21, and then routed at 27 into a mixing means 28. The back and forth motion of water motor piston 24 drives pump ram arm 25 in corresponding motion. Metering pumps 32 move in linked response to pump ram arm 25 and draw chemicals from chemical inlets 13 through inlet valves 29 at the backstroke of water motor piston 24. Upon the forestroke, the chemicals are pumped through outlet valves 30, in predetermined proportions, into lines 31 for entry into mixing means 28. The water and chemical mixture is continuously pumped outward at 16 for desired use.

The invention incorporates a reversing switch which automatically alternates water flow to either side of a piston to drive it back and forth. The movement of the piston back and forth drives the linked metering pumps which can individually be set to a proper proportion for pumping of liquid chemicals. The same water driving the piston is later mixed with the chemicals pumped. FIG. 3 shows a plan view, partially broken away, and FIG. 4 is a partial elevational view. The reversing switch and valve assembly 21 resides atop water motor blocks 33A and 33B which form opposite ends of piston cylinder 34. A reversing rod 35 is caused to move back and forth urging spring shift cylinder 36 to be caught and released at keepers 37 by oppositely disposed latch pawls 38. This motion of reversing rod 35 is caused by actuating arm 39 movement. Actuating arm 39 engages reversing rod 35 and main piston shaft 40 of water motor 23, which in turn is linked with pump ram arm 25. Pump ram arm 25 ultimately is the link for driving piston rods 41 of metering pumps 32. It is thus seen that reversing rod 35, actuating arm 39, main piston shaft 40, and pump ram arm 25 travel back and forth. In response, shift cylinder 36 is caught and released.

The catch and release of shift cylinder 36 is obtained alternately by two opposing trip sleeves 42 striking projections 43 of each latch pawl 38 causing them to pivot about hinges 44 and release engagement at keepers 37. By means of later-described spring shifter 45, shown in FIG. 5, shift cylinder 36 snaps away from an engaging latch pawl to the opposite latch pawl where it is caught and momentarily held in the other position. This motion is automatically alternated as reversing rod 35 commutes back and forth.

Spacers 46 housed within spacer bushings 47 are disposed between water motor blocks 33A and 33B for interconnection therebetween. Static guide shaft 48 provides both support and guide for actuating arm 39, as it is allowed to slide therealong by means of bushing 49. Actuating arm 39 grips main piston shaft 40 by provision of securing bolts 50. At the opposite shaft end fixed bushing 51 receives main piston shaft 40 in close tolerance but allowing free back and forth movement. Intermediate opposite ends, pump ram arm 25 is secured to main piston shaft 40 by locking lugs 52. Pump ram arm 25 moves in response to the main piston shaft and is additionally engaged to piston shaft assemblies 53 secured also by locking lugs 52. Piston rods 41 are thereby linked to shaft 40 and translate back and forth for operation of metering pumps 32. The piston shaft assemblies 53 and metering pumps 32 are mounted in the system by square hole bushings 54 at water motor block 33B, pump ram arm 25, and pump block mounting 55. Pump block mounting 55 and square hole bushings 54 are static with pump ram arm 25 movable in response to main piston shaft 40.

Main piston shaft 40 slidably passes through bushings 56, 57 and 51. Bushings 56 and 57 being disposed at outwardly facing sides of water motor blocks 33A and 33B, respectively. In further support of, and for purposes of rigidity, in the assembled system, spacers 58 are provided and extend from water motor block 33A, through 33B, to pump block 55 with bushings 59A and 59B therebetween. Two spacers 58 at opposite sides of main piston shaft 40, below pump ram arm 25, are envisioned. A hinged cover plate 60 may be optionally provided for protection and safety in covering the moving assembly below.

The automatic reversing switch and valve assembly 21 can be further appreciated when viewing FIGS. 3 and 5 together. FIG. 5 is a cross-sectional view showing the reversing motion by means of water entering first the left side and then the right side of the piston cylinder 34 of water motor 23. A spring plate 61 is included in reversing switch 21 and it holds springs 62 which pressure latch pawls 38 back into catching position for the return movement of shift cylinder 36 immediately after pivoting to release shift cylinder 36 caused by trip sleeves 42. The catch and snap effected by reversing switch 21 is attained by the compression of spring shifter 45 as trip sleeve 42 pushes against slidably retained bushing 63. Shift cylinder 36 includes a bushing 63 at opposite sides which are prevented from snapping out of the shift cylinder by "C" rings 64 fixed within the cylinder adjacent opposite open ends thereof. The movement of trip sleeves 42 is determined by the motion of reversing rod 35 onto which they are fixed by snap rings 65. Main piston shaft 40 moves back and forth to carry arm 39, which has two mating parts in this embodiment, and reversing rod 35. In the example disclosed, reversing rod 35 is fixed on actuating arm 39 by snap rings 66. Main piston shaft 40 is fixed to actuating arm 39 by bolts 50 passing through holes 68 to secure the two mating parts constituting arm 39. Pump ram arm 25 is further fixed on main piston shaft 40 preferably with snap rings 67. These linked components travel back and forth in unison.

As reversing rod 35 carries a trip sleeve 42 toward a projection 43, sleeve 42 contacts a bushing 63 and compresses spring shifter 45. Upon contact with projection 43, latch pawl 38 pivots and releases shift cylinder 35. Compressed spring shifter 45 then releases its energy surging shift cylinder 36 to the opposite side where the opposing latch pawl 38 catches and retains shift cylinder 36 at this other side. The action is repeated from one side to the other.

Figure 7:
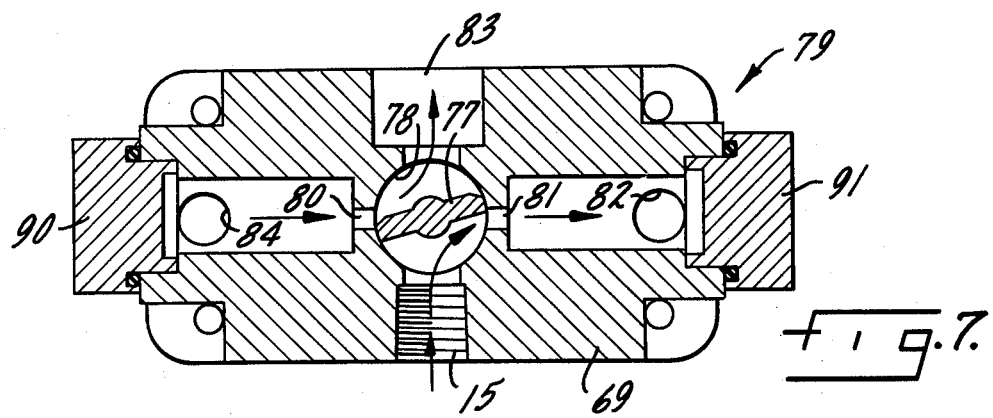
FIG. 7 is a sectional view of the interior of the valve block of the invention taken along line 7—7 of FIG. 5 looking in the direction of the arrows at the chemical intake stroke.
Figure 8:
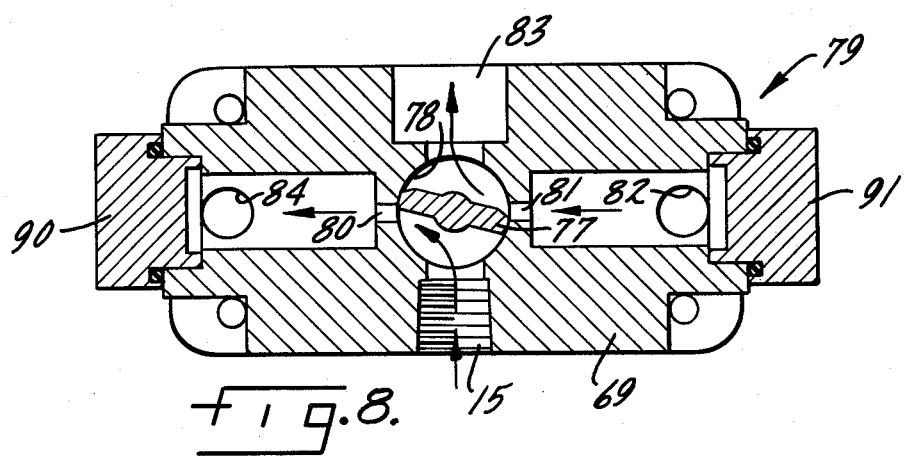
FIG. 8 is a view of the valve block structure shown in FIG. 7, at the chemical pumping stroke.

When viewing FIGS. 6–8 along with FIG. 5, the alternating water flow direction into motor 23, achieved by reversing switch and valve assembly 21, is shown. Secured atop valve body 69 is valve switch plate 70. Valve switch plate 70 is stationary and includes a rotation limit slot 71 wherein shift bushing 72 travels secured to shift cylinder 36 above and to valve lever 73 below by means of dowel pin 74. As shift cylinder 36 snaps back and forth it forces shift bushing 72 to travel back and forth within rotation limit slot 71. "O" rings 74 are disposed along shift cylinder 36 adjacent keepers 37 to cushion any impact with bearing block 75. Bearing blocks 75 hold hinges 44 and provides a passageway for trip sleeves 42, shift cylinder 46 and reversing rod 35 therein. Bearing blocks 75 are fixably attached to valve body 69 with switch plate 70 therebetween.

As shift bushing 72 automatically moves from left to right, and back, it turns valve lever 73 and valve stem 76. Rotation limit slot 71 defines the amount of rotation which valve stem 76 experiences in this reciprocating manner. Valve lever 73 links valve stem 76 to shift bushing 72. Valve stem 76 extends downwardly and terminates at reversing vane 77. Reversing vane 77 occupies vane chamber 78 of reversing valve 79. Reversing valve 79 forms the lower portion of reversing switch and valve assembly 21 and includes body 69 as described. The reversing of vane 77 by rotation of stem 76 effects an alternating open and closed position of chamber ports 80 and 81 for acceptance or denial of water from inlet 15.

In FIG. 7 water is directed to chamber port 81 and in FIG. 8 to chamber port 80. The position of FIG. 7 corresponds to the position of water motor piston 24 in FIG. 5, where water is entering, as viewed in the drawing, to its right. Water is introduced to the right side via cylinder port 82 which opens to chamber port 81. As water motor piston 24 travels to the full left position reversing rod 35 moves left to carry trip sleeve 42, at the right of FIG. 5, to encounter projection 43 of right latch pawl 38, thereby disengaging shift cylinder 36. The concomitant release of spring shifter 45 will snap shift cylinder 36 to the left position whereupon it will be caught by the opposite, or left side, latch pawl 38 at the left keeper 37. Upon this occurrence, the orientation for reversing valve 79 will be that of FIG. 8 wherein chamber port 80 is now open to incoming water from inlet 15. Thereby water now enters to the left side of water motor piston 24 and water contained at the right side is forced back upward through cylinder port 82, back through chamber port 81, to be expunged at outlet 83. Water passing from inlet 15 through chamber port 80 passes through cylinder port 84, being a second entry port into piston cylinder 34, identical to cylinder port 82 but at the opposite side of valve body 69. Accordingly, as water fills the cylinder from cylinder port 84, water motor piston 24 is forced to the right until such time that the trip sleeve 42 at the left side of shift cylinder 36 releases the left latch pawl 38 and shift cylinder 36 snaps to the opposite position thereby putting reversing vane 77 back into the alignment shown in FIG. 7.

This alternating fill-left and fill-right sequence rapidly drives piston 24 back and forth. It is mounted along main piston shaft 40 by means of snap rings 85. Water is prevented from seeping past water motor piston 24 by means of conventional "O" rings 86 and 87. Cylinder wall 88 is contacted by "O" ring 87 for snug sealing therebetween. Cylindric piston spacers 89 define the bounds of travel for water motor piston 24 and fit within recesses of water motor blocks 33A and 33B to form a tight cylinder seal. The bounds of piston travel correspond to the position where trip sleeves 42 contact projections 43, as would be clear.

Water motor piston 24 carries main piston shaft 40 and pump ram arm 25 in this reciprocating motion. It will be seen that as the fill-right and fill-left vane alignments are alternated, the movement imparted by pump ram arm 25 to piston shaft assemblies 53 of metering pumps 32 is alternating intake and pump strokes. The alignment in FIG. 7 being a fill-right mode will force pump ram arm 25 to the left and an intake stroke for metering pumps 32 is effected. Oppositely, the alignment of reversing vane 77 shown in FIG. 8 fills piston cylinder 34 to the left of water motor piston 24 forcing pump ram arm 25 to the right and causing piston shaft assembly 53 to be in the pump stroke mode. This alternating operation is automatic and occurs very rapidly. In the embodiment of the example shown herein, the proportional mixing system is capable of mixing at a rate of 200 gallons per hour at a 40 p.s.i. incoming water supply. It will be noted that both the left and right stroke of water motor piston 24 expunges water at water outlet 83. Whereas only one pump stroke is imparted to piston shaft assembly 53. Accordingly, the calibrations for proportions of chemicals to be pumped is based upon a full piston cylinder 34 chamber volume for each pump stroke volume of metering pumps 32.

As seen in FIGs. 3-8, clean-out plugs 90 and 91 are disposed at opposite sides of valve body 69 for ease of access to interior portions. Such clean-out provision is provided as conventionally applied in valve construction.

The back and forth alternating motion imparted to pump ram arm 25 by means of the reversing switch and valve assembly 21 facilitates the predetermined liquid portions uniquely obtained by the invention. The invention further provides adjustment of the back stroke of piston rods 41 forming a part of piston shaft assembly 53. FIGS. 9-11 illustrate the preferred mode envisioned for a metering pump 32 and piston shaft assembly 53. The significance of the adjustment feature of this invention allows the user to selectively set any of a plurality of metering pumps in proportion to water pumped from water motor 23. Piston shaft assembly 53 includes fluid rod stop 92 having threaded piston rod 41 threadably engaged therein. Fluid rod stop 92 comprises a hollow sleeve-like conformation with a square end 93, mounting portion 94, and indicator sleeve 95 with indicator plate 96 thereon. Fluid rod stop 92 is preferably of integral construction having square end 93 adapted for slidable insertion within square hole bushing 54.

Adjustment for stroke is obtained by adjustment knob 97 fixed on piston rod 41 by means of a set screw inserted through threaded hole 98. Piston rod 41 is threadably engaged with piston 99 and held thereat by a securing means, shown as nut 100. The distance between adjustment knob 97 and end 101 of piston 99 is a constant dimension. Adjustment of the backstroke of piston rod 41 is obtained by turning adjustment knob 97 which changes the position of fluid rod stop 92 along piston rod 41 by means of the screw threading. Adjustment knob 97 has smaller diameter collar 102 which, in the mode disclosed, is force-fit over indicator tube 103. As adjustment knob 97 is turned it turns piston rod 41 drawing fluid rod stop 92 toward adjustment knob 97, or away from it, when turned clockwise or counterclockwise, respectively. This rotation exposes, adjacent the end of indicator tube 103, a selected portion of indicator plate 96. The calibration of indicator plate 96 represents fluid ounces which are to be siphoned through inlet valve 29 on the backstroke. Locating bushing 104 is freely slidable over indicator tube 103 and is affixed by locking lugs 52 to pump ram arm 25. Bushing 104 moves in response to the back and forth motion of pump ram arm 25 as previously described. Positioning snap ring 105 snap-engages around locating bushing 104 and facilitates connection to pump ram arm 25. On the pump stroke, bushing 104 contacts smaller diameter portion 102 of adjustment knob 97. On this pump stroke piston rod 41 is driven to the right such that end 101 of piston 99 advances to a full forestroke position within cylinder 106. As pump ram arm 25 moves to the left, during the intake, or backstroke, locating bushing 104 slides back to contact clamp collar 107 and push it, fluid rod stop 92, and piston rod 42, all to the left. Clamp collar 107 is mounted on mounting portion 94 by means of snap ring 108 and set screw 109. A spring stop sleeve 110 is movably mounted at the other end of mounting portion 94 and is resiliently spaced from clamp collar 107 by means of spring 111. Spring 111 absorbs shock as, at the end of the backstroke, spring stop sleeve 110 contacts square hole bushing 54.

Adjustment to the intake stroke is effectively attained when observing that locating bushing 104 slides back and forth contacting clamp collar 107 on the backstroke and adjustment knob 97 on the forestroke. The distance which the backstroke travels is determined by the extent to which adjustment knob 97 positions fluid rod stop 92 from it. For purposes of explanation, FIG. 10 illustrates exposed number "6" of indicator plate 96, which represents, in the preferred example of the invention, a full backstroke for piston 99 drawing six fluid ounces into metering pump 32 through inlet valve 29 from a chemical reservoir, such as at 11 shown in FIG. 1. Prior to actuating the system in this full backstroke position, square end 93 is located at a full right position within square hole bushing 54, having been drawn to the closest distance to adjustment knob 97.

In the maximum left position, the "off" line of indicator plate 96 would be exposed at indicator tube 103, thereby positioning square end 93 in the maximum left position within square hole bushing 54 at the farthest distance from knob 97. In this maximum left position, the backstroke of piston 99 is eliminated because the travel of pump ram arm 25 is limited by the movement of water motor piston 24. The "off" position locates clamp collar 107 approximately at this maximum left position and locating bushing 104 terminates its leftward travel slightly before moving contact with clamp collar 107. In forestroke, at the "off" position, locating bushing 104 moves to the right toward adjustment knob 97, but since knob 97 and piston 99 would have experienced no intake stroke to the left there would be no rightward, or pump stroke, return travel. Any particular metering pump 32 could be shut off while other metering pumps 32 could be set at desirable proportions.

In the preferred mode of the invention shown in the drawing, four identical metering pumps 32 are provided. However a larger number of pumps could be included by utilizing a larger pump ram arm 25 and a corresponding widening of pump block 55 and water motor block 33B, as would be clear. Also it is envisioned that the size of metering pumps may vary to have greater or lesser siphon capacity than six ounces. Additionally, the size of water motor 23 may vary to change the length of stroke and volume of cylinder 34 to attain particular proportioning needs. Such modifications are intended to fall within the scope of the invention.

The example shown in the drawing further includes a series of reed switches 112 located at water motor block 33B, with one switch for each metering pump. The reed switches detect movement of a magnet at the end of square end 93 located in magnet housing 113. The position of reed switches 112 is set such that when adjustment knob 97 is adjusted to the "off" position the reed switches 112 are not activated, and a conventional indicator light could be associated with the switch which would not illuminate for any metering pump set to the "off" position. The indicator lights could be mounted in a panel at cabinet 10 for ease of view and supervision of pumping procedures.

In siphoning water from reservoirs 11, the entrance to metering pumps 32 is by means of inlet valves 29, which are one-way valves well known to the industry. At the pump stroke of piston 99, chemicals are pressured upward through outlet valves 30, which are similarly one-way valves. Cylinder 106 desirably includes a cylinder seal and piston lubrication means 114 circumferentially extending around the cylinder 106 in close tolerance with the outside diameter of piston 99, as would be well understood by one skilled in the industry.

Liquid chemicals pumped from outlet valves 30 travel through tubes, schematically represented at 31 of FIG. 2, to meet, and blend with, water exiting reversing switch and valve assembly 21. The known volume of water exits through outlet 83 and is carried through a tube, represented at 27, to blend with proportioned chemicals in a mixing means 28. Mixing means 28 may be housed within cabinet 10, and thereafter the mixed solution is directed through line 16. The water driving the system continues under input pressure to pulse through mixing means 28 effectuating mixing motion therein.

The invention has been described herein with respect to a preferred mode for practicing the disclosed proportional mixing system with water motor drive. It will be understood that motor 23 is well suited for operation with other liquids under pressure and need not be limited to the preferred mode utilizing water. Equivalent structures well within the bounds of the invention are clearly envisioned. Additional conventional electronic sensing devices for indicating chemical reservoir fluid levels, mixture reservoir fluid levels and metering pump operation, can be easily adapted as required in a particular pumping operation. Also, lubrication of moving parts may be achieved in a conventional manner easily adapted to the system disclosed and claimed.

ACHIEVEMENT OF THE INVENTION

A proportional mixing system with water motor drive has been disclosed which allows for the mixing of predetermined proportions of a plurality of liquid chemicals with a known quantity of water pulsed from a water motor. Water pressure drives the entire system and alternate backstroke and forestroke of metering pumps is accomplished by a unique reverse switching and valve assembly whereby precise amounts of water are mixed with the selected individual chemical proportions in a continuous automatic fashion. The system includes relatively few moving parts requiring little supervision and maintenance. A special adjustment of piston shaft assemblies for the metering pumps permits selected proportioning of chemicals drawn from chemical reservoir drums, or the like. A reversing vane within a valve body is driven by the reversing switch alternating flow of water to the left and then to the right side of the water motor piston forcing the piston back and forth to pump an exact amount of water for mixing with the chemicals. Water pulsed from the water motor is expunged to be mixed with chemicals pumped through an outlet valve of the metering pumps. Chemicals and water are directed to a mixing means subsequent to pumping, and the mixing is effected by the continuing water flow under inlet pressure.

The invention has particular application for the proportional mixing of chemicals utilized in the printing industry. The invention further eliminates any need for electrical motors but may have electrical sensing devices attached to it for monitoring, if desired, or include on demand operation using float levels when stored mixtures run low.

It is significant that a plurality of metering pumps may be linked to the unique water motor drive and reversing switch assembly wherein individual metering pumps may be pre-set at calibrated positions or may be individually turned off for non-pumping of a particular chemical. The proportional mixing apparatus of this invention has wide application and it is operable automatically upon entrance of water pressure to the reversing valve assembly.

What is claimed is:
1. A proportional mixing system with liquid motor drive comprising a reversing switch and valve assembly having a reversing switch means alternately movable from a first position to a second position, said reversing switch means including a reciprocating reversing member, shift means associated with said reversing member and movable thereby, and valve means including a reversing vane operatively connected to said reversing switch means capable of moving from a first position to a second position, said reversing vane linked to said shift means and being rotatable through a limited arc, said valve means including opposite port means, said valve means reversing vane being movable in response to said reversing switch means to alternately open and close said opposite port means, said valve means further including a liquid inlet and outlet opening to said reversing vane, said shift means comprising a hollow, spring retainer structure and opposite keeper means, said reversing switch means including latching and releasing means adapted to alternately catch and release opposite keeper means, said reversing member movable back and forth through said shift means and capable of driving said shift means in a reciprocating path, opposite trip means carried on said reversing member and positioned to contact and alternately move opposite latching and releasing means, and spring shifter means retained within said spring retainer structure and positioned for compression contact by opposite trip means, said spring shifter capable of alternately compressing and releasing at contact a trip means with a latching and releasing means to drive said shift means to an opposite position for latch engagement by an opposite keeper means, a liquid motor associated with said reversing switch and valve assembly and having a piston cylinder opening at opposite sides to said valve port means, a main piston movable within said cylinder, and a main piston shaft secured to said main piston movable therewith, actuating arm means linking said main piston shaft and said reversing member whereby said reversing member moves in response to main piston shaft motion, at least one metering pump actuated by movement of said main piston shaft and being linked thereto by pump ram arm means, said metering pump having a piston rod, whereby volumes of first liquid will be siphoned and pumped therethrough in predetermined quantities and said system will be automatically driven by the first liquid entering the said inlet of said valve means and introduced to alternate sides of said liquid motor piston with said liquid being alternately expunged at the opposite port means to subsequently exit the valve means at said outlet opening, and said expunged first liquid and a second liquid pumped by said metering pump in predetermined proportions can be directed to be subsequently mixed.

2. A proportional mixing system with liquid motor drive as claimed in claim 1 wherein said main piston shaft includes adjustment means capable of altering the backstroke travel of said piston rod, and said main piston shaft carries a rod stop means movably engaging the piston rod.

3. A proportional mixing system with liquid motor drive as claimed in claim 2 wherein said metering pump includes a piston secured by said piston rod and housed in a piston cylinder, said adjustment means comprising an adjustment knob means, indicator tube, and locating bushing slidably positioned around said indicator tube, said locating bushing secured to said pump ram arm means and movable in response thereto.

4. A proportional mixing system with liquid motor drive as claimed in claim 3 wherein the distance between said adjustment knob means and piston is fixed.

5. A proportional mixing system with liquid motor drive as claimed in claim 4 wherein said rod stop includes a first end movably positioned within a bushing whereby the distance between said adjustment knob means and said first end is adjustable to facilitate predeterming volumes of liquids pumped.

6. A proportional mixing system with liquid motor drive as claimed in claim 5 wherein said rod stop associated with a clamp collar fixed thereon whereby said bushing is movable between said clamp collar and adjustment knob means and capable of alternate intake and pump stroke movement along a limited path in response to said pump ram arm means, whereby intake movement drives said locating bushing to impact said clamp collar imparting intake travel of said piston rod and alternately at a pump stroke impacts said adjustment knob means imparting piston rod travel in the opposite direction.

7. A proportional mixing system with liquid motor drive as claimed in claim 6 wherein said piston shaft is adjustable to locate the rod stop at the intake travel limit of said locating bushing whereby piston intake travel is eliminated.

* * * * *